United States Patent
Ray

(10) Patent No.: US 7,365,682 B2
(45) Date of Patent: Apr. 29, 2008

(54) SYSTEM AND METHOD FOR DISTRIBUTED SIGNAL COMPRESSION FOR COOPERATIVE GEOLOCATION

(75) Inventor: Gary A. Ray, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/474,796

(22) Filed: Jun. 26, 2006

(65) Prior Publication Data

US 2007/0296631 A1    Dec. 27, 2007

(51) Int. Cl.
   *G01S 1/24* (2006.01)
(52) U.S. Cl. ...................... 342/387; 342/442; 342/463
(58) Field of Classification Search ................ 342/386, 342/387, 442, 463, 465; 455/456.5, 456.6, 455/457
   See application file for complete search history.

(56) References Cited

U.S. PATENT DOCUMENTS

| | | | | |
|---|---|---|---|---|
| 5,570,099 A | * | 10/1996 | DesJardins | .................. 342/378 |
| 6,184,829 B1 | * | 2/2001 | Stilp | .......................... 342/387 |
| 6,201,499 B1 | * | 3/2001 | Hawkes et al. | ............. 342/387 |
| 6,845,240 B2 | * | 1/2005 | Carlson et al. | .......... 455/456.1 |
| 2004/0214585 A1 | * | 10/2004 | Olaker | .................... 455/456.1 |

* cited by examiner

*Primary Examiner*—Dao Phan
(74) *Attorney, Agent, or Firm*—Harness, Dickey & Pierce, P.L.C.

(57) ABSTRACT

A cooperative geolocation system and method. The system and method involves time stamping a plurality of received signals and modifying, such as compressing, one or more of the received signals, either with the same or with different rates of compression. A processing subsystem including a geolocation processor is used to correlate various pairs of received signals and to extract time difference of arrival (TDOA) or frequency difference of arrival (FDOA) information and to use this information in cooperatively geolocating the signal source emitting the signals being analyzed. The system enables greater rates of data compression, and thus frees up bandwidth in a network in which it is employed, as compared with previously existing cooperative geolocation systems. The present system further can perform the cooperative geolocation determination without first decompressing the compressed signals, but rather performing a correlation process directly on designated pairs of signals to extract the needed TDOA/FDOA information.

20 Claims, 4 Drawing Sheets

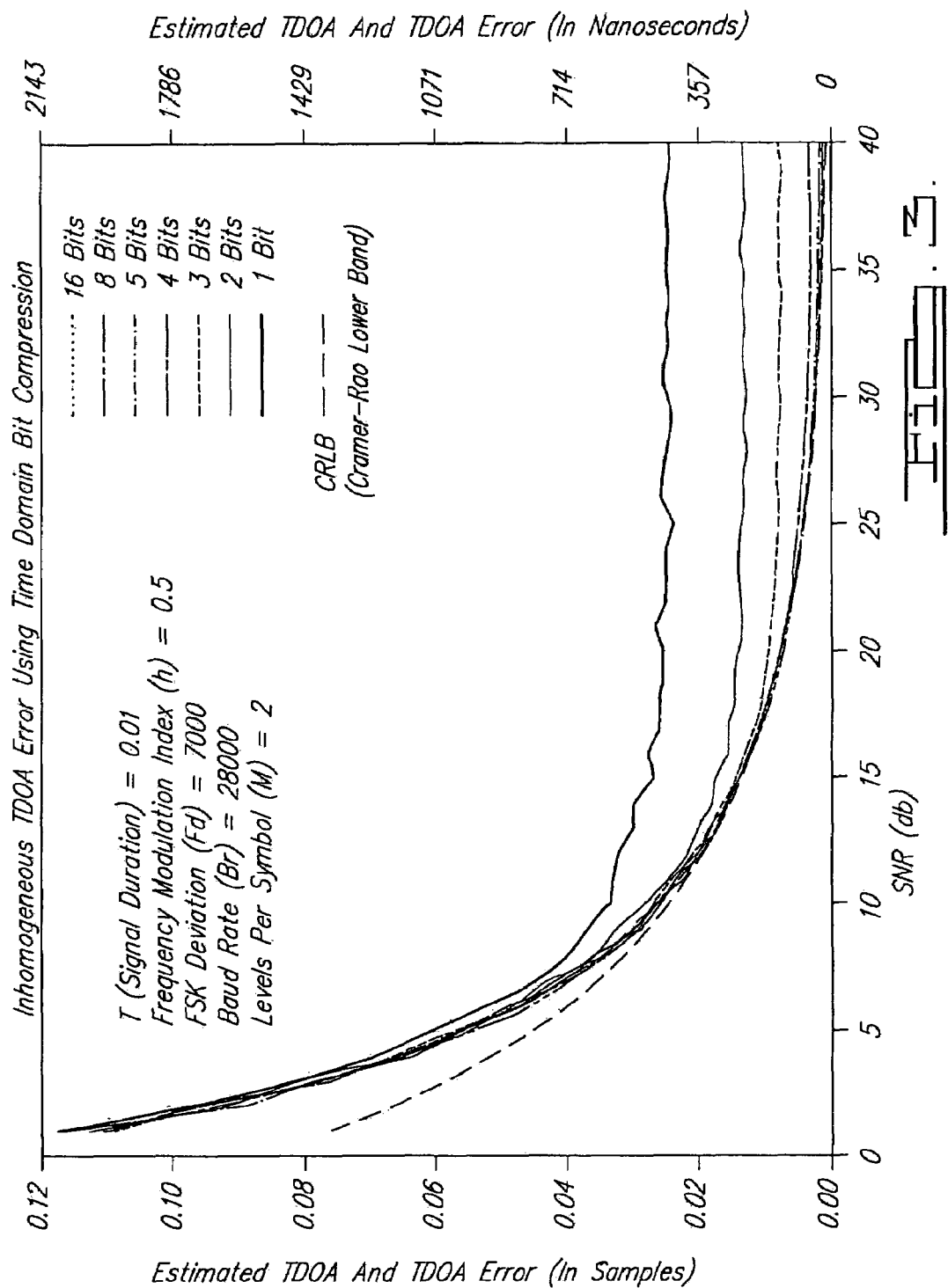

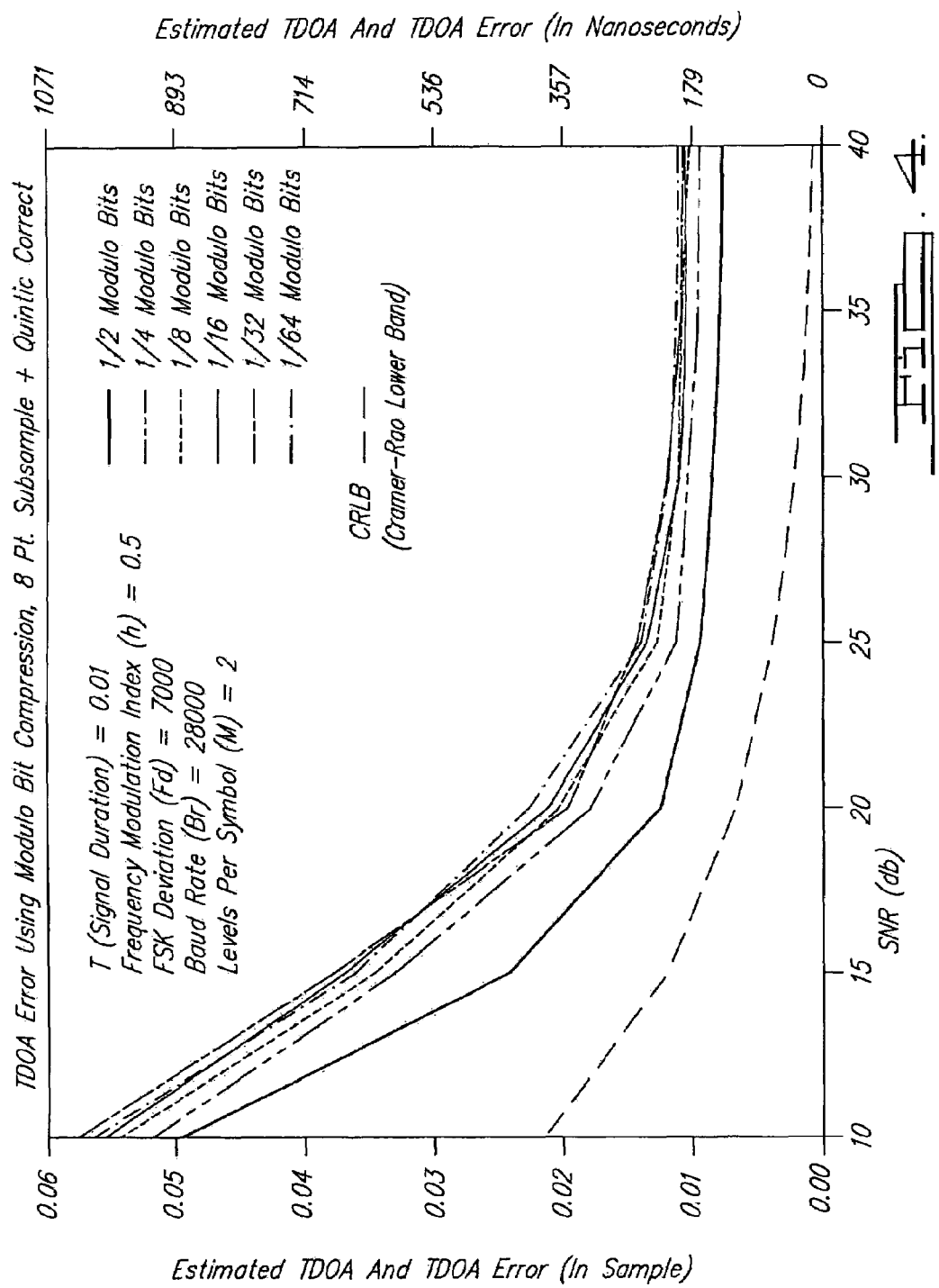

SYSTEM AND METHOD FOR DISTRIBUTED SIGNAL COMPRESSION FOR COOPERATIVE GEOLOCATION

FIELD

The present disclosure relates to cooperative geolocation systems, and more particularly to a cooperative geolocation system and method that enables geolocation to be performed with a smaller amount of information being sent over a network to a geolocation processor than required by previously developed systems.

BACKGROUND

The statements in this section merely provide background information related to the present disclosure and may not constitute prior art.

It is becoming increasingly important in battlefield applications to be able to timely geolocate threat emitters existing on the battlefield. Such threat emitters often are using communication devices emitting various forms of signals, typically acoustic or electromagnetic wave signals. Intercepting these signals and forwarding them through a network into a geolocation processor requires an efficient means of exchanging the signal data being transmitted. The usual method of exchange typically involves an inefficient intermediate frequency (IF) representation of a portion of the signal received. This IF representation may even be compressed using either lossless or lossy compression algorithms. However, with lossless compression, it is difficult or impossible to achieve the desired higher compression ratios. Lossy methods compress each signal individually (without regard for all the other similar signals being transmitted) and then decompress them upon reception before correlation. So again, with lossy methods, it is also difficult or impossible to achieve higher compression ratios.

With the widespread, continuing use of relatively low bandwidth networks in battlefield applications, the network itself is increasingly becoming a "choke point" that prevents the wider use of cooperative geolocation techniques. In a practical sense, this may prevent many of the commanders within the battlefield space from using the network to acquire information from a wide variety of ground, air and national assets for use in decision making processes.

Precision cooperative geolocation using time difference of arrival (TDOA) and frequency difference of arrival (FDOA) requires coordinated processing of shared information across multiple platforms within the battlefield. Presently, this involves exchanging raw, time-tagged time/space/ frequency coincident IF signal receptions in order to have a chance of seeing the same signal across multiple receiving platforms communicating on the network. The reason this data exchange is needed is that cooperatively geolocating an unknown transmitted signal requires the use of correlation techniques to compute the time and/or frequency difference of arrival of the transmitted signal to pairs of displaced receivers (i.e., receivers located at different geographic locations). This same signal arrives at slightly different times (potentially with slight frequency offsets) due to the path distance difference (and slight differences in radial velocities) between the transmitter and any given pair of receivers receiving the signal. These slight differences can be inferred by correlating the two raw receptions against each other without knowing anything about the actual transmitted signal. In order to do this, each signal received must be sent to wherever the correlations are being processed. However, exchanging this raw IF information can require a great deal of network bandwidth, especially in battlefield situations where multiple, potential target transmissions must be located and evaluated simultaneously within a short time period. In a point-to-point network, exchanging "B" bits between all "N" nodes requires BN (N−1)/2 bits to be transmitted. In a broadcast network, this still requires BN bits to be transmitted. Thus, with existing systems, a significant amount of information needs to be transmitted over the network to the processing location, and this amount of information grows significantly with the number of nodes in the network transmitting information to the processing location. Thus, it would be highly beneficial to provide a cooperative geolocation system that is able to geolocate a signal source while requiring less signal information, and with less processing power being required at the processing location.

SUMMARY

The present disclosure is related to a system and method for geolocating a signal source. The system and method is able to geolocate a signal source using less information and less processing power by a geolocation processor. In one implementation, a first receiver is used to receive a signal being emitted by a signal source having an unknown location, and to time stamp the signal as a first signal. A second receiver is used to receive the same signal and to time stamp the signal as a second signal. The time stamped first and second signals are then forwarded to a geolocation processor, with at least the second signal being modified to reduce its bandwidth before its transmission. The geolocation processor uses the time stamp for the second signal and the time stamp for the first signal, and correlates the second signal and the first signal to determine a factor that is indicative of the time difference of arrival of the second signal relative to the first signal.

In one particular implementation, the second signal is compressed. In another implementation it is frequency companded. The correlation may be performed by using the geolocation processor to analyze correlation peaks from the second signal and the first signal (which is unmodified), and selecting a peak from each signal having the greatest magnitude.

It is an advantage of the system and method that the second signal does not necessarily need to be reconstructed prior to being analyzed, provided a compression operation is used on the second signal, to determine the time difference of arrival of the second signal relative to the first signal. This enables the geolocation process to be performed with significantly less processing power from the geolocation processor. Furthermore, additional signals received by additional receivers of the system can be compressed a greater degree than the second signal, thus saving bandwidth. This is because the correlation process is still able to extract the needed signal information from the more highly compressed signals without requiring reconstruction of the highly compressed signals.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 3 is a graph of the difference in time domain of arrival (TDOA) error as a function of amplitude quantization; and FIG. 4 is a graph of TDOA error as a function of compression level.

DETAILED DESCRIPTION

The following description is merely exemplary in nature and is not intended to limit the present disclosure, application, or uses.

Figure 1:
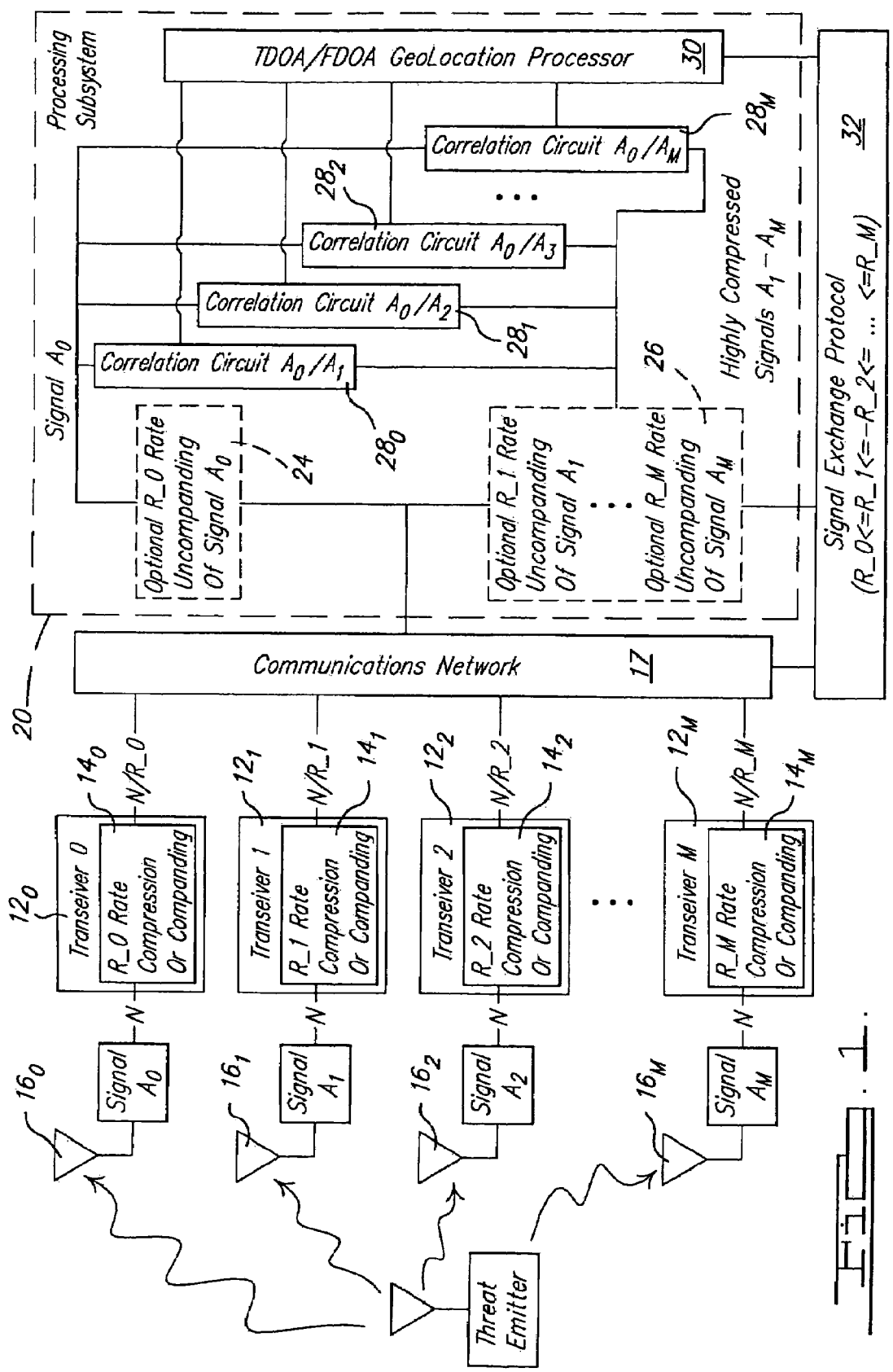
FIG. 1 is a block diagram of one embodiment of the system of the present disclosure.

Referring to FIG. 1, there is shown a distributed signal compression system 10 in accordance with one embodiment of the present disclosure. The system makes use of a plurality of transceivers $12_0$, $12_1$, $12_2$, through $12_m$ that each has an associated antenna 16. Each transceiver 12 receives the same signal which is shown as emanating from a threat emitter, but could be any transmission whose source must be located. These received signals are all essentially the same except for differences in delay, frequency, power and other environmental corruption. In one example, the signals being emitted from the threat emitter may be electromagnetic wave signals. This system 10 may also be used to receive acoustic (i.e., audio wave) signals. In such an embodiment the antennas 16 would represent acoustic transducers that receive the same audio wave signal along different paths. Thus, the specific type of antenna used for the antennas 16 will depend on the type of signal being emitted by the threat emitter. Similarly, the type of transceiver utilized for each transceiver $12_0$-$12_m$ will depend on the type of signal being received by the antennas 16. Thus, the transceivers $12_0$-$12_m$ may each be tailored for use with electromagnetic wave signals, audio wave signals, or any other specific type of signal being generated by the threat emitter. For convenience and discussion purposes, the signals are designated $A_0$, $A_1$, $A_2$ and $A_m$. It will be appreciated that the transceivers $12_0$-$12_m$ are located at different locations. Each transceiver $12_0$-$12_m$ has associated with it a compression subsystem $14_0$-$14_m$ that is able to apply a selective rate of data compression to the signal received by its associated transceiver. This rate of compression may in fact be no compression at all. Alternatively, the amount of compression may be successively increased by compression subsystems $14_0$-$14_m$ such that $14_0$ applies the smallest amount of compression (or no compression at all), while compression subsystem $14_m$ applies the greatest amount of compression.

The outputs of each of the transceivers 12 are connected through a communications network 17 (which may be wired or wireless) to an input of a processing system 20.

A first uncompanding circuit 24 may be used for the process to uncompand signal $A_0$, if the frequency companding method is being used. If other methods like modulo compression or time domain dithered quantization are used, no uncompanding step is necessary. One or more additional uncompanding circuits 26 may be employed to uncompand the signals received from each of the transceivers $12_1$-$12_m$. Circuits $14_0$-$14_m$ may thus be broadly viewed as "bandwidth reducing circuits", because both compression and companding serve to reduce the bandwidth needed to transmit the signals from the transceivers $12_0$-$12_m$.

The processing subsystem 20 further includes a plurality of correlation circuits 28 that "pair" the signal $A_0$ with an associated one of each of signals $A_1$-$A_m$. Essentially, each of circuits $28_0$-$28_m$ correlate a possibly compressed version of signal $A_0$ with one of the highly compressed signals $A_1$-$A_m$. For example, circuit $28_0$ correlates $A_0$ with signal $A_1$, while circuit $28_1$ correlates signal $A_0$ with signal $A_2$, and so forth. Other correlation pairings are possible, such as $A_1$ and $A_2$ but the system 10 could be readily modified to work with various signal pairings.

The correlation performed by each of circuits $28_0$-$28_m$ identifies the peak of the correlation of each of the two signals it receives and passes this information onto a geolocation processor 30 that receives outputs from each of the circuits $28_0$-$28_m$. The geolocation processor 30 uses the signal peak location and time stamp information associated with each of the signals $A_0$-$A_m$ to determine the time difference of arrival. A similar process can also determine the frequency offset of the two signals; this process often uses the complex ambiguity function ("CAF") in its computation instead of a simple correlation. From the above-described information, the time difference of arrival of the signals $A_0/A_1$, $A_0/A_2$ through $A_0/A_m$ can be determined. The formula below shows the general mathematical form of the CAF function of two signals $s_1$ and $s_2$. The correlation of these two signals is obtained by removing the exponential factor from the integral. Here the superscript asterisk denotes complex conjugation and j denotes the square root of −1. Tau and f are the time and frequency arguments.

$$A(\tau,f) = \int_0^T s_1(t) s_2^*(t+\tau) \exp(-j2\pi ft) dt.$$

Obviously, the greater the number of different signal pairs that are analyzed by the geolocation processor 30, the greater the degree of accuracy in determining the location of the signal source generating the signal that is received by each of the transceivers $12_0$-$12_m$.

Figure 2:
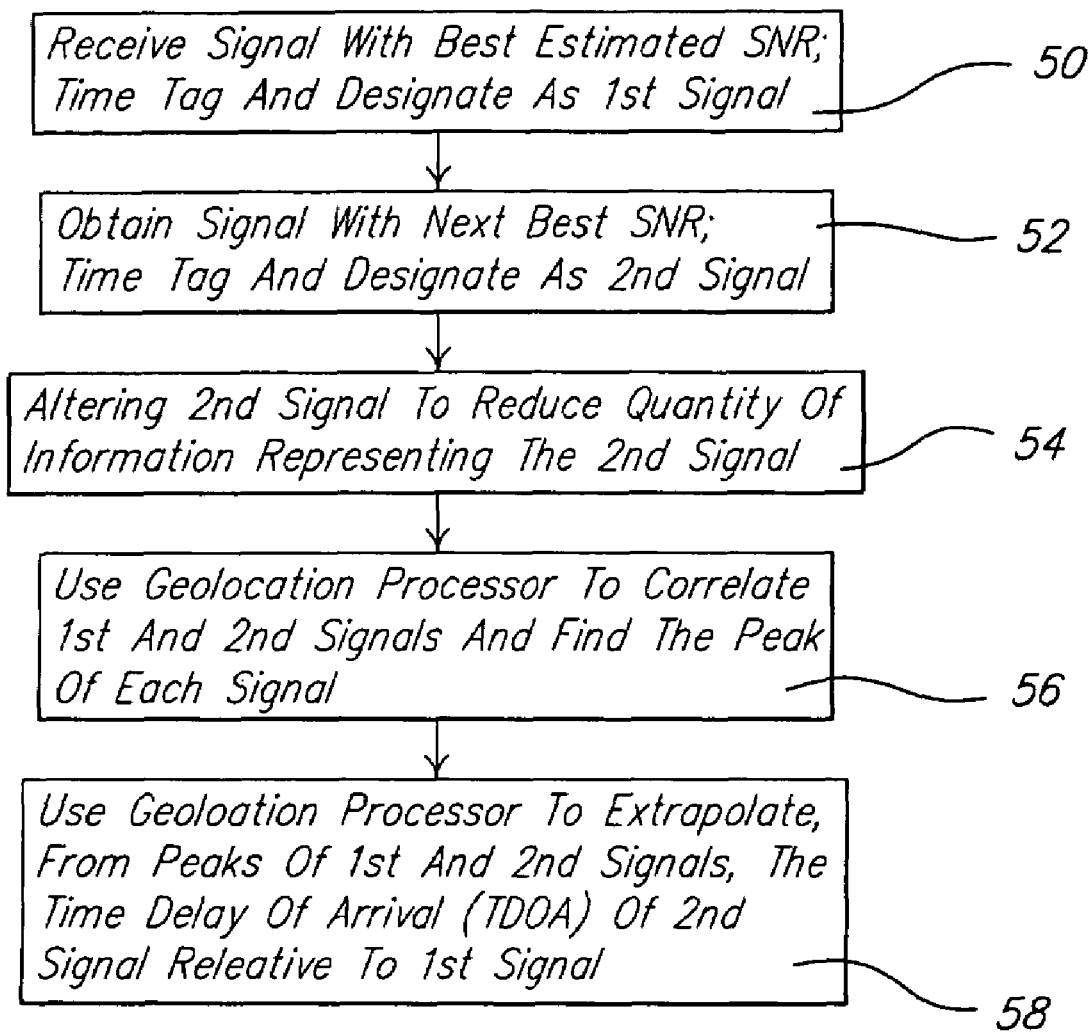
FIG. 2 is a flow chart illustrating major operations performed by the system of FIG. 1.

With reference to FIG. 2, a flow chart summarizing the operation performed by the system 10 is illustrated. Initially, the best signal, for example the signal with the best estimated signal-to-noise ratio (SNR), is received and time tagged, and designated as the "first" signal (e.g., signal $A_0$) received and time tagged, and designated as the "first" signal (e.g., signal $A_0$) as indicated at operation 50. This may require some preliminary analysis/communication between the transceivers $12_0$-$12_m$ to make this determination. The signal with the next best SNR value is obtained, time tagged and designated as the "second signal" (i.e., for example, signal $A_1$), as indicated at operation 52. It will be appreciated that the signals being discussed in connection with operations 50 and 52 are in fact the same signal being received by different transceivers 12 shown in FIG. 1. In operation 54 the second signal is modified to reduce the quantity of information that is used to represent it. Put differently, it is modified to reduce its bandwidth. This modifying may be accomplished by compressing the signal using different types of compression schemes. In one preferred form, the system 10 shown in FIG. 1 makes use of modulo compression. However, time domain compression involving time domain dithered quantization may be used. Frequency companding may also be used as an alternative to time domain compression methods.

In operation 56, the geolocation processor 30 analyzes the first and second signals and locates the peak of each signal as part of the correlation operation. At operation 58, the geolocation processor 30 uses the correlation information obtained at operation 56 to extrapolate the time delay of arrival of the second signal relative to the first signal.

With regard to operation 54, a specific process used to alter the quantity of information representing the second signal may be selected based on the needed accuracy of the time difference of arrival information that is required. A brief discussion of the alternative methods mentioned in connection with operation 54 will now be provided.

Time Domain Dithered Quantization

Time domain compression involves doing coarser quantization to lower the data rate necessary to exchange signal IF information. Thus, the accuracy of the time difference of arrival (or frequency difference of arrival) is traded off against the available network bandwidth. Nevertheless, even coarser quantization still tends to preserve TDOA and FDOA information. However, to make time domain compression useful, it is preferred that dithering of the samples be performed for higher SNR signals. The dithering can be improved by making its standard deviation depend on the signals estimated SNR. This particular method does not require decompression by the processing subsystem 20 of FIG. 1. Thus, a coarsely quantized signal can be correlated directly with a more accurate version of itself (e.g. signal $A_0$ in FIG. 1) to achieve accurate TDOA estimates. FIG. 3 shows how the TDOA accuracy varies as a function of the number of bits used in the quantization. As can be seen, the TDOA accuracy does not degrade significantly until the number of bits is reduced severely. For example, referencing FIG. 3, at a SNR of 20 db, the difference between the TDOA error, as represented by the graphs of signals represented by sixteen bits and five bits, is still quite small in relation to the difference between the graphs representing signals of sixteen bits and those of two bits.

Frequency Companding

For certain frequency constrained signals, companding of the spectrum provides an alternative to time domain methods. Companding involves a non-linear transform of the frequency information in a signal based on the signal spectrum to create a reduced bit representation of the Fourier Transform of the original signal. This compressed version of the Fourier Transform of the original signal is then transmitted in place of the original signal. An additional advantage with frequency companding is that fewer operations need to be performed by the TDOA determination process since the signals can be multiplied and inverse transformed to find the correlation peak between each signal pair. This method, however, requires an uncompanding step, namely reversing the companding, before processing.

Modulo Compression

Modulo compression is a technique that essentially involves compressing the remainder of two signals. Mathematically, if s is a sampled integer value from a signal collection and L is a modulo compression level (an integer as well), then s can be (signed or unsigned) modulo L compressed by computing s mod (L) which is the signed or unsigned remainder after dividing s by L. After the first signal is sent, the second signal is compressed by computing its bit value modulo a specific level. This causes the signal to wrap many times in amplitude. A decoder used to receive the modulo compressed signal could approximately unwrap it by knowing the first signal. However, it is not necessary to unwrap the received signal, the correlation can be done directly. The decoder typically first interpolates the received modulo signal and then correlates and looks for the highest peak. This is chosen and then further interpolation is done around that particular peak, just as would be done with any of the previously described methods. Even in low noise situations, the correct peak can be chosen. This is indicated in FIG. 4. FIG. 4 is a plot showing the results of a simulation that verifies modulo compressed signals with different delays can be correlated accurately without unwrapping (i.e., direct correlation with the modulo signal). This simulation used frequency shift key (FSK) signals with random delays and various amounts of compression of the encoded second signal using, as side information (SI), the first signal. As can be seen, there is performance deterioration in terms of TDOA accuracy, as is expected. However, the deterioration incrementally becomes less significant as more compression is added. Thus, if reduced accuracy in the TDOA determination can be tolerated, especially during high network usage or during dense geolocation event processing, geolocations can be cooperatively computed and then the highest priority one selectively refined for further accuracy.

Signal Exchange Protocol

A signal exchange protocol system 32 can optionally be used with the system 10. A signal exchange protocol essentially is included at a higher level than the basic transmission of the compressed signal IF information that occurs in the operation of the system 10, as described in connection with FIG. 1. The signal exchange protocol system 32 would operate at a higher network layer, and would include a built-in awareness of the requirements of the geolocation process, to control the physical layer transmission process in order to decrease the overall network data requirements, while still meeting the network geolocation performance in terms of both accuracy and rate. In a battlefield geolocation scenario, this protocol can request that data be sent in phases by the transceivers $12_0$-$12_m$. For example, "phase 1" would use a reduced level of accuracy and provide quicker signal of interest isolation. Thus, for situations where it is imperative that even a crude geolocation of a threat emitter be obtained as quickly as possible, the signal exchange protocol may be employed to manage the system 10 to achieve the most rapid (albeit crude) geolocation of the threat emitter. Subsequent phases of operation would be commanded by the signal exchange protocol to allow successive refinement of those signals being used to perform the geolocation process, and to obtain increased accuracy when/where needed. Essentially this signal exchange protocol would manage the scarce network bandwidth resource, while still delivering accurate geolocations.

The various embodiments described herein enable TDOA/FDOA information to be obtained by using less bandwidth of the network in which they are employed. This is in part because previously developed systems rely on lower compression ratios to obtain a needed level of accuracy of the signals being analyzed during the geolocation processing operation. The implementations of the present disclosure, however, take advantage of the special nature of the cooperative geolocation situation by recognizing that each of the transceivers $12_0$-$12_m$ are receiving the same version of the signal, corrupted with different levels of noise, and delayed different amounts of time or experiencing potentially different frequency offsets. The implementations described herein recognize that increased amounts of data compression do not significantly affect the accuracy of the TDOA or FDOA information being carried by each corrupted, received signal. Therefore, significant amounts of compression can be applied to the signals being transmitted over the network without significantly affecting the accuracy of the TDOA/

FDOA processing operation, and thus the accuracy of the cooperative geolocation determination being made by the system 10.

The various implementations described herein enable even better use of system/network resources which can significantly enhance network centric operations (NCO) in battle space scenarios with limited bandwidth. The implementations described herein all enable the cooperative geolocation process to be performed with significantly reduced communication bandwidth. This can provide an attendant increase in overall system geolocation rate because of the reduced communications bandwidth. The reduced communications bandwidth necessary to perform the geolocation process enables the available remaining bandwidth of the network to be used to implement other mission critical tasks.

What is claimed is:

1. A method for geolocating a signal source, comprising:
using a first receiver to receive a signal being emitted by said signal source, and to time stamp said signal as a first signal;
using a second receiver to receive said signal and to time stamp said signal as a second signal;
modifying said second signal using frequency companding to form a reduced bandwidth second signal;
supplying said first signal and said reduced bandwidth second signal to a processing subsystem remote from said first and second receivers;
using said processing subsystem to analyze said time stamp for said reduced bandwidth second signal and said time stamp for said first signal, and correlating said reduced bandwidth second signal and said first signal, to determine a time difference of arrival of said reduced bandwidth second signal relative to said first signal; and
using said time difference of arrival to geolocate said signal source.

2. The method of claim 1, wherein using said first and second receivers comprises using receivers adapted to receive electromagnetic wave signals.

3. The method of claim 1, wherein using said first and second receivers comprises using receivers adapted to receive audio wave signals.

4. The method of claim 1, wherein modifying said second signal comprises compressing said second signal.

5. The method of claim 1, wherein compressing said compressed second signal comprises modulo compressing said compressed second signal to produce a modulo compressed second signal.

6. The method of claim 1, wherein modifying said second signal comprises using non-linear frequency companding to modify said second signal.

7. The method of claim 4, further comprising:
using a third receiver to receive said signal and to time stamp said signal as a third signal; and
modifying said third signal to produce a third signal having a reduced bandwidth; and
using said time stamp for said third signal and said time stamp for said first signal to determine a time difference of arrival for said third signal relative to said first signal.

8. The method of claim 7, wherein modifying said third signal comprises compressing said third signal; and
wherein said third signal is compressed by a different factor than said second signal.

9. The method of claim 1, wherein correlating said second signal and said first signal comprises analyzing signal peaks from said second signal and said first signal, and selecting a peak from each of said first and second signals having the greatest magnitude.

10. A method for determining a time difference of arrival (TDOA) of a signal being emitted by a signal source, and being received by a plurality of receivers, the method comprising:
using a first receiver to receive said signal being emitted by said signal source, and to time stamp said signal as a first signal;
using a second receiver to receive said signal and to time stamp said signal as a second signal;
modifying said second signal using frequency companding to form a reduced bandwidth second signal;
using said time stamp for said second signal and said time stamp for said first signal, and correlating said second signal and said first signal, to determine a time difference of arrival of said second signal relative to said first signal, without the need to further modify said second signal;
using a third receiver to receive said signal and to time stamp said signal as a third signal;
modifying said third signal to produce a modified third signal having a reduced bandwidth;
using said time stamp for said modified third signal and said time stamp for said first signal to determine a time difference of arrival for said modified third signal relative to said first signal; and
where the second reduced bandwidth signal and said modified third signal include different levels of bandwidth reduction from one another and that also differ from said first signal in bandwidth.

11. The method of claim 10, wherein said signal comprises an electromagnetic wave signal, and said first and second receivers comprise electromagnetic wave receivers.

12. The method of claim 10, wherein said signal comprises an audio signal, and said first and second receivers comprise audio wave receivers.

13. The method of claim 10, wherein modifying said second signal comprises compressing said second signal.

14. The method of claim 10, wherein using a second receiver comprises using a mobile second receiver.

15. The method of claim 10, further comprising using a signal exchange protocol to manage processing of said first and second signals in accordance with predetermined operational parameters.

16. A geolocation system for geolocating a signal source that is emitting a signal, the system comprising:
a first subsystem for receiving said signal being emitted by said signal source, and time stamping said signal as a first signal, and transmitting said first signal with said time stamp;
a second subsystem that receives said signal, time stamps said signal as a second signal, modifies said second signal using frequency companding to produce a reduced bandwidth second signal, and transmits said reduced bandwidth second signal;
a processing system for receiving said first signal and said compressed second signal, correlating said second signal and said first signal, and using said time stamps associated with said first and second signals to geolocate said signal without requiring further modification to said second signal.

17. The system of claim 16, wherein said processing system operates to determine a time difference of arrival of said second signal and said first signal.

18. The system of claim 16, wherein at least one of said first and second subsystems comprises an electromagnetic wave receiver, and said signal comprises an electromagnetic wave signal.

19. The system of claim 16, wherein at least one of said first and second subsystems comprises an audio wave receiver, and said signal comprises an audio wave signal.

20. The system of claim 19, further comprising a third subsystem that receives said signal, time stamps said signal as a third signal, modifies said third signal to produce a reduced bandwidth third signal, and transmits said reduced bandwidth third signal to said processing subsystem; and said second and third subsystems being adapted to apply different levels of bandwidth reduction such that said first signal, said reduced bandwidth second signal and said reduced bandwidth third signal all have differing bandwidths.

* * * * *